April 2, 1946.  P. J. BEEDLE  2,397,773
CENTERING DEVICE FOR LATHES
Filed Sept. 22, 1943

PERCY J. BEEDLE
INVENTOR.

BY *James D. Kinnan*
ATTORNEY

Patented Apr. 2, 1946

2,397,773

UNITED STATES PATENT OFFICE 2,397,773

CENTERING DEVICE FOR LATHES

Percy J. Beedle, Portland, Oreg.

Application September 22, 1943, Serial No. 503,434

1 Claim. (Cl. 82—44)

This invention relates to devices for centering stern tubes, pipes and the like with respect to the tail-stock, and chuck of a lathe.

One of the principal objects of the invention is the provision of a device of this character which quickly, conveniently and automatically centers and holds the work securely for accurate machining during both heavy and light cuts in a lathe.

Centering devices now common in the art consist of a heavy disc with a number of radially disposed adjusting bolts which are unable to hold the work securely, especially during the heavy cuts. They are also difficult to adjust and as a result most of the work dealt with thereby cannot be accurately machined.

My new and improved centering device comprises a heavy disc rotatably mounted on the tail-stock of a lathe and provided with a plurality of dogs slidably mounted in tapered slots in the periphery of the disc so that as the device is presented to the work the dogs cause the work to automatically center itself, and by their wedging action hold the work securely in place.

The foregoing and other objects will appear as my invention is more fully hereinafter described in the following specification illustrated in the accompanying drawing, and finally pointed out in the appended claim.

Figure 1:
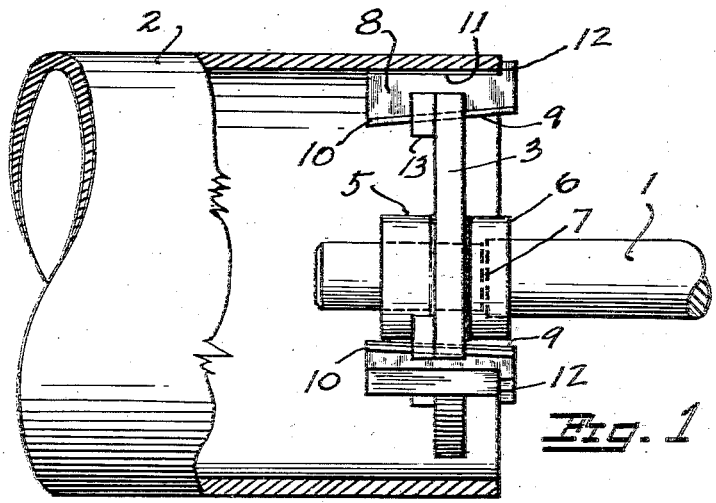
Figure 1 is a fragmentary sectional side elevation of a tube centered and held in place with respect to a tail-stock of a lathe with a centering device made in accordance with my invention.

Referring now more particularly to the drawing:

Reference numeral 1 indicates the usual tail-stock of a lathe with respect to which the work to be dealt with in the form of a tube or pipe 2 is to be centered for being worked upon by a cutting tool, or the like, not shown.

Figure 2:
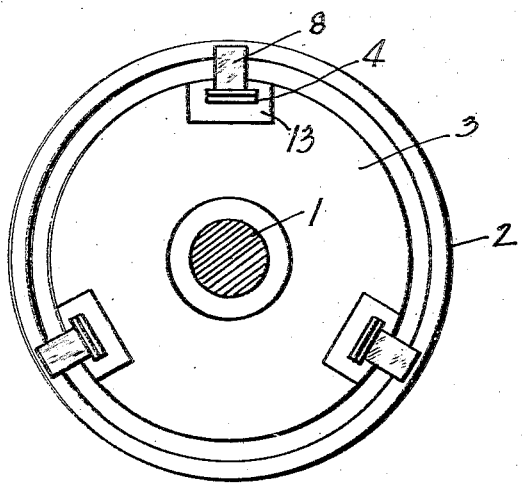
Figure 2 is an end elevation of Figure 1 as viewed from the right hand end thereof.

The centering device comprises a disk 3 formed with transverse slots 4 at any desired number of locations around its periphery as shown in Figure 2. One face of the disk 3 is formed with a boss or hub 5 to house a roller bearing which rotatably embraces the tail stock 1. Against the opposite face of the disk 3 I place a roller thrust bearing 6 which bears against a shouldered portion 7 of the tail-stock which prevents lateral movement of the disk to the right of the tail-stock as viewed in Figure 1. In each slot 4 in the periphery of the disk 3, I slidably mount a dog 8 which is tapered and flanged as at 9 and 10 respectively along its bottom edge. Its top edge is horizontal as at 11 and terminates on its outer end in a shouldered portion 12. To provide additional bearing surface and greater stability for the dogs 8, I either form integral with or attach to the disk 3 projections 13 which are correspondingly grooved to slidably embrace the dogs.

In presenting the work piece 2 to the centering device, I first move the dogs inwardly, or to the left as viewed in Figure 1, until the end of the work may be slid over them and brought into contact with the shouldered portion 12 of the dogs. As the work-piece is advanced farther it will be apparent that the tapered portions 9 of the dogs will be advanced through the tapered slots in the disk 3 and cause the work piece to become securely wedged to the disk concentrically with respect thereto, it being remembered that the thrust bearing 6, bearing against the shouldered portion 7 of the tail-stock, resists the advancement of the work with respect to the dogs.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

A device for centering a tubular work-piece with respect to the tailstock of a lathe, said device consisting of a disc rotatably mounted on a reduced portion of the tailstock, transverse slots formed in the periphery of the disc, each slot being laterally grooved on both sides throughout its length, a gripping dog slidably mounted in each of said slots, each dog being tapered and flanged along its bottom surface and terminating in a shoulder portion at its outermost end for engagement with the work-piece and to be moved thereby into gripping relationship with the work, said flanged portions of the dog being slidably embraced by the lateral grooves of the slot for rectilinear movement in a single plane to preclude tipping or rocking of the dog in the slot.

PERCY J. BEEDLE.